US012581575B2

(12) United States Patent
Fu et al.

(10) Patent No.: US 12,581,575 B2
(45) Date of Patent: Mar. 17, 2026

(54) DRIVER ARRANGEMENT FOR POWERING TWO LOADS

(71) Applicant: SIGNIFY HOLDING B.V., Eindhoven (NL)

(72) Inventors: Jie Fu, Shanghai (CN); Zhiquan Chen, Shanghai (CN); Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 35 days.

(21) Appl. No.: 18/837,909

(22) PCT Filed: Feb. 8, 2023

(86) PCT No.: PCT/EP2023/053039

§ 371 (c)(1),
(2) Date: Aug. 13, 2024

(87) PCT Pub. No.: WO2023/152626

PCT Pub. Date: Aug. 24, 2023

(65) Prior Publication Data

US 2025/0142701 A1 May 1, 2025

(30) Foreign Application Priority Data

Mar. 22, 2022 (EP) .................................... 22163520

(51) Int. Cl.
*H05B 45/3725* (2020.01)
*H05B 45/355* (2020.01)

(52) U.S. Cl.
CPC ....... *H05B 45/355* (2020.01); *H05B 45/3725* (2020.01)

(58) Field of Classification Search
CPC .......................... H05B 45/355; H05B 45/3725
See application file for complete search history.

(56) References Cited

U.S. PATENT DOCUMENTS

| | | | | |
|---|---|---|---|---|
| 6,181,114 | B1 | 1/2001 | Hemena et al. | |
| 9,419,510 | B2 | 8/2016 | Liu | |
| 10,277,134 | B2 * | 4/2019 | Sonobe | H02M 3/33546 |
| 2002/0190696 | A1 | 12/2002 | Darshan | |
| 2005/0269997 | A1 | 12/2005 | Usui et al. | |
| 2006/0120120 | A1 | 6/2006 | Lin et al. | |
| 2017/0288557 | A1 | 10/2017 | Fang et al. | |

* cited by examiner

*Primary Examiner* — Henry Luong

(57) ABSTRACT

A driver arrangement for powering a first load in an operation mode and a second load in a second mode. In the operation mode, a power factor correction circuitry generates a PFC output signal that powers the first load, and a switched-mode power supply is able to generate an offset signal that is superimposed over the PFC output signal for attenuating a ripple in the PFC output signal. In the second mode, the power factor correction circuitry is disabled and the switched-mode power supply is able to generate a supply power for the second load meanwhile disabled from generating the offset signal. The switched-mode power supply therefore provides a dual functionality.

14 Claims, 3 Drawing Sheets

DRIVER ARRANGEMENT FOR POWERING TWO LOADS

CROSS-REFERENCE TO PRIOR APPLICATIONS

This application is the U.S. National Phase application under 35 U.S.C. § 371 of International Application No. PCT/EP2023/053039, filed on Feb. 8, 2023, which claims the benefit of International Application No. PCT/CN2022/076318, filed on Feb. 15, 2022 and European patent application Ser. No. 22/163,520.4, filed on Mar. 22, 2022. These applications are hereby incorporated by reference herein.

FIELD OF THE INVENTION

The present invention relates to the field of driver arrangements, particularly those that include power factor correction circuitry.

BACKGROUND OF THE INVENTION

Driver arrangements are commonly used to provide power to a load, such as a light emitting element. Typically, a driver arrangement will be capable of converting (e.g., AC) input power to (e.g., DC) output power suitable for powering the load. Some driver arrangements comprise power factor correction circuity, for modifying or adjusting a power factor of a power factor correction (PFC) output signal that defines the output power provided to the load or on a bus.

The PFC output signal may be a signal across an output capacitor of the power factor correction circuitry, so that it is smoothed to emulate a DC signal. However, the power factor correction circuity is a slow-response converting circuity which regulates its output by sensing an average output. The PFC output signal will therefore retain a ripple (voltage, or current) of around 100/120 Hz, the precise frequency of which depends upon depending on the ripple of the AC input power, which is typically around 50/60 Hz. It would be advantageous to reduce or attenuate the size of the ripple in the PFC output signal, e.g. remove or compensate for the ripple, especially for LED lighting since the output luminous flux of an LED lighting arrangement is highly sensitive to the power provided to the LED lighting arrangement. The ripple of the PFC output signal, if not regulated, will result in a corresponding ripple in the brightness of light output by the LED, which would cause human perceptible or capturing device (such as camera) perceptible flicker.

A common way of overcoming this issue in the art is to use a second converting circuity cascading from the power factor correction circuity. This topology can be labelled a double-stage converting circuitry. The second converting circuitry regulates the PFC output signal into a further stabilized signal. US20050269997A1 discloses a switching power source apparatus comprising a power factor corrector and a DC-DC converter at the output of the power factor corrector. U.S. Pat. No. 6,181,114B1 discloses a circuit with a boost circuit connected to AC, a flyback circuit at the output of the boost circuit and providing a main output, and a circuit magnetically coupled with the boost circuit and providing an aux voltage. One drawback of such double-stage converting circuitries is high material cost and high space requirements, since the second converting circuitry has to handle the whole PFC output signal meaning that its power rating is quite high requiring large and materially expensive components. It has been proposed to use a switching converting circuitry at the output of the power factor correction circuity, where the switching converting circuitry is used for compensating just the AC component of the PFC output signal, and not the whole PFC output signal. This means that the power rating of the switching converting circuitry is relatively smaller and has a lower cost and size compared to the double-stage converting circuitry. A suitable prior art example is described by US 2017/0288557A1. This topology is often called/labelled a 1.5 stage or 1.25 stage converting circuitry, compared with the above mentioned double-stage. US20020190696A1 also discloses a power supply apparatus comprising a power factor correction (PFC) unit to generate a PFC output voltage made up of a DC component with a residual AC ripple, and a regulator to generate a correction voltage which is combined with the PFC output such that the AC ripple is substantially reduced.

On the other hand, as lighting devices becomes "smart", a standby capability of the light is preferred. Moreover, connectivity of the light device is also needed wherein a wired or wireless communication is a must. It would also be advantageous to provide a driver arrangement that is capable of switching a first load on and off (e.g., to turn a light on or off), whilst providing a power supply to a second load (e.g., communication circuitry or the like). This has been performed, for instance, by configured a second load to draw power from the AC input power directly, from the power factor correction circuitry or from the second converting circuitry of a double-stage converting circuitry.

There is therefore a clear desire for improved driver arrangements.

SUMMARY OF THE INVENTION

The invention is defined by the claims.

According to examples in accordance with an aspect of the invention, there is provided a new approach or circuit topology that, on top of using a main PFC stage to provide a PFC output signal, uses a switched-mode power supply to:

- provide a SMPS (switched-mode power supply) output signal to be superimposed with the PFC output signal to overcome the ripple in the PFC output signal, wherein the combined signal powers a first load, such a main (in term of the primary function of the whole device) load in an operation mode; and
- provide a separate supply power for a second load, such as an auxiliary (in term of the secondary function of the whole device) load in a second, for example standby mode, wherein in this second mode no power is generated for the first load by the main PFC stage or the switched-mode power supply.

In this way, a single set of circuitry performs a dual purpose, advantageously reducing a size of the circuitry required to perform both tasks, as well as reducing power consumption and/or wastage by only requiring a single set of circuitry to be active.

Embodiments provide a driver arrangement for powering a first load and a second load.

The driver arrangement is configured to be switchable between at least an operation mode and a second mode, and comprises: an input interface to receive an AC mains power; a power factor correction, PFC, circuitry connected to the input interface and comprising a first output interface adapted to electrically connect to a first load, the power factor correction circuitry being configured to operate to generate, from the AC mains power, a PFC output signal at the first output interface thereby providing the first load with the PFC output signal in the operation mode, the PFC output signal having a ripple corresponding to the AC mains power, and the driver arrangement is adapted to disable the power factor correction circuitry in the second mode; and a switched-mode power supply with a second output interface superimposes the first output interface with respect to the first load.

The switched-mode power supply is configured to: generate an offset signal at the second output interface such that the offset signal and the PFC output signal provided to the first load are superimposed, to compensate the ripple to thereby smooth the power provided to the first load, in the operation mode, and, most importantly, generate a first supply power for a second load different from the first load meanwhile the driver arrangement being adapted to disable the switched-mode power supply from generating the offset signal, in the second mode.

Embodiments thereby use the switched-mode power supply to perform a secondary function of generating a first supply power for a second load, as well as to attenuate or reduce a ripple in the PFC output signal. Using the switched-mode power supply to perform both of these functions provides a more efficient use of space and processing resource.

Moreover, since the switched-mode power supply is designed to attenuate a ripple in the PFC output, it only needs to deliver a fraction of the power provided by the PFC output signal. This provides a higher efficiency than operating, for example, a full load driver circuit.

The first load is, when connected to the driver arrangement, connected across the first output interface and the second output interface. Powering the first load with the PFC output signal means that the PFC output signal flows to a load connected to the first output interface without being further converted, e.g., using a power commutation and/or switching mechanism.

In some examples, the switched-mode power supply is connected to the input interface and configured to: when the driver arrangement operates in the second mode, operate to generate the first supply power (VCC) at the second output interface and/or at a third output interface of the switched-mode power supply.

Thus, the function performed by the switched-mode power supply (SMPS) may switch depending upon the mode in which the driver arrangement operates. When the driver arrangement operates in an operation mode, the SMPS attenuates the ripple in the PFC output signal. When the driver arrangement operates in a second mode, the SMPS supplies a supply voltage for the second load. Depending on the power/voltage requirement, the SMPS may provide the supply voltage in the second mode via either the second output interface or a further interface. For example, if the supply voltage for the second load is similar with the amplitude of the offset signal, the supply voltage can be provided via the second output interface; otherwise, the SMPS may have the further interface, such as a different tap or a different winding of the power inductor, to provide the supply voltage.

The second mode may be a standby mode in which the first load is disabled but the second load is still powered; and when the driver arrangement operates in the standby mode, the driver arrangement is adapted to disable the power factor correction circuitry from generating the PFC output signal at the first output interface, and the driver arrangement is adapted to disable the switched-mode power supply from generating the offset signal at the second output interface such that no PFC output signal or offset signal superimposed to the first load.

In this embodiment, in standby mode, the power factor correction circuitry is disabled thus a high power loss of the power factor correction circuitry working in a low power standby mode is prevented. The switched-mode power supply (SMPS) for providing the offset signal is inherently low power (since the offset signal is small), thus the switched-mode power supply (SMPS) has low power loss when working in the low power standby mode. The efficiency of the whole driver arrangement in the standby mode is improved.

In some examples, when operating in the operation mode, the driver arrangement is adapted to cut off a connection between the switched-mode power supply and the second load so as to prevent or restrict the switched-mode power supply from generating or providing the first supply power to the second load.

In some embodiments, the switched-mode power supply is configured to generate the first supply power for the second load at the second output interface, and the driver arrangement further comprises a switch between the second output interface and the second load and configured to when the driver arrangement operates in the operation mode, be open so as to cut off the connection between the second output interface and the second load; and when the driver arrangement operates in the second mode, be close so as to connect the second output interface to the second load.

The driver arrangement may further comprise an auxiliary power converter separate to the switched-mode power supply and connected to the second load, the auxiliary power converter being configured to: when the driver arrangement operates in the operation mode, operate to generate and provide a second supply power for the second load; and when the driver arrangement operates in the second mode, the driver arrangement is adapted to disable the auxiliary power converter (140) from generating and providing the second supply power to the second load.

In some examples, the auxiliary power converter is magnetically coupled to the power factor correction circuitry such that, as the driver arrangement switches between the operation mode and the second mode, the power factor correction circuitry and the auxiliary power converter respectively and synchronously becomes operate for supplying the first load and disabled from supplying the first load.

For instance, the power factor correction circuitry may comprise a PFC winding or inductor (used for performing power factor correction). The auxiliary power converter may comprise a corresponding auxiliary winding or inductor magnetically coupled to the PFC winding of the power factor correction circuitry. The auxiliary power circuitry may be configured to draw power from the PFC winding during a power factor correction operation performed by the PFC circuitry (as a change in current through the PFC winding will induce a corresponding change in current in the auxiliary winding). This topology is widely used for providing power for the first load and the second load. But a problem is that the whole PFC circuitry needs to operate in order to enable the auxiliary power converter: even in standby mode wherein the first load no longer works, causing high power loss. Thus the invention can be used to fully disable both of the PFC circuitry and the auxiliary power converter in standby mode, and use the SMPS to provide the first supply power as standby power during the standby mode. When the power factor correction circuitry is disabled, there is no significant change in the current flow through the PFC winding, such that no power is induced in the auxiliary power circuitry by the PFC winding and/or the power factor correction circuitry, rendering the auxiliary power converter disabled.

In a further embodiment, the second output interface may be connected in series with the first output interface and the series connection of the first and second output interfaces is adapted to connect across the first load. In this embodiment, the SMPS only needs to provide the offset signal complimentary to the AC component of the PFC signal thus the SMPS can be designed with small power rating.

Alternatively, the second output interface may be connected in parallel with the first output interface, and the first and second output interfaces are adapted to connect across the first load.

In some examples, the switched-mode power supply comprises: a switching element and a power commutation element, for generating the offset signal and the first supply power; and a controller configured to control an operation of the switching element in order to adjust the offset signal and the first supply power.

This embodiment defines the detailed structure of the switched-mode power supply. The power commutation element can electrically provide the offset signal, and can electrically or magnetically provide the first supply power.

In some examples, the switched-mode power supply comprises: a current detector adapted to connect in series to the first load and detect a first load current, being a current through the first load; and the controller is configured to generate the offset signal by controlling the operation of the switching element to adjust the offset signal so as to align the first load current with a reference current.

This embodiment cancels the ripple by controlling the SMPS in a feedback manner. It should be understood that a feedforward manner is also possible as an alternative, wherein a ripple of the AC mains or the PFC output signal is sensed and inverted (optionally with a proportional factor) into the offset signal, without detecting the current through the first load and generating the offset signal according to the detected current.

In an embodiment, the switched-mode power supply may comprise: a voltage detector adapted to detect a first supply voltage, being the voltage of the first supply power; wherein the controller is configured to generate the first supply power by controlling the operation of the switching element to adjust the first supply voltage so as to align the detected first supply voltage with a reference voltage.

This embodiment provides details of providing the first supply power in a feedback manner.

The first load may comprise one or more light emitting diodes.

In some examples, the second load comprises one or more of the following: a microcontroller; a radio-frequency communication unit; and/or a sensor.

There is also proposed a lighting system comprising a previously described driver arrangement; one or more light emitting diodes as the first load; and the second load.

This aspect of the invention provides low flicker and low standby power for a lighting system and follows the technology trend and desired advantages.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
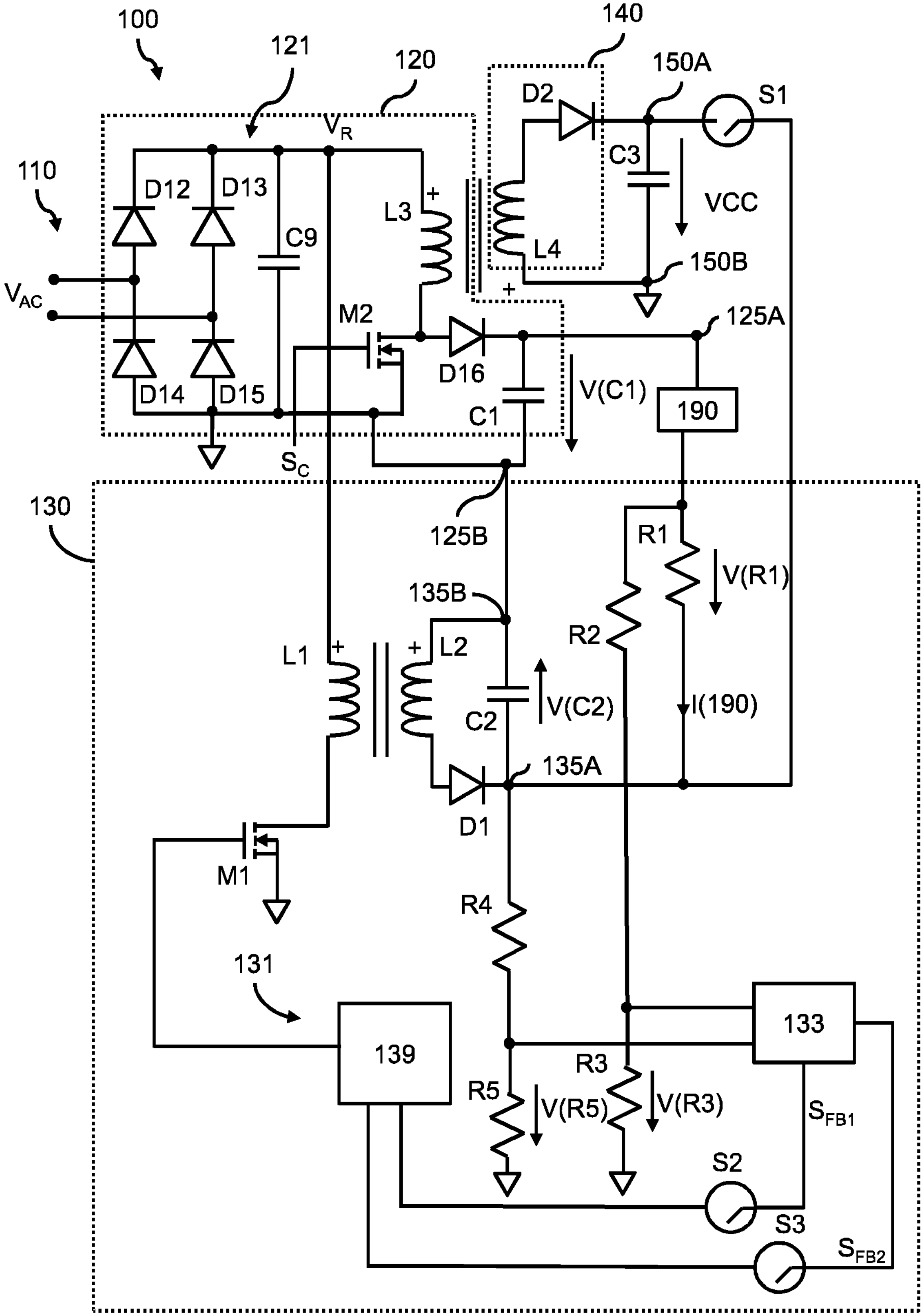
FIG. 1 illustrates a driver arrangement according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driver arrangement for powering a first load and a second load. Power factor correction circuitry generates a PFC output signal that powers the first load. A switched-mode power supply is able to generate an offset signal that is superimposed over the PFC output signal for attenuating a ripple in the PFC output signal. The switched-mode power supply is also able to generate a supply power for the second load. The switched-mode power supply therefore provides a dual functionality.

FIG. 1 illustrates a driver arrangement 100 according to an embodiment. The driver arrangement 100 comprises an input interface 110, power factor correction circuitry 120, a switched-mode power supply 130 and an optional auxiliary power converter 140.

The input interface 110 is configured to receive an AC mains power $V_{AC}$. This may be provided by an AC mains power supply/grid (not shown).

The power factor correction (PFC) circuitry 120 is configured to convert the AC mains power $V_{AC}$ into a PFC output signal V(C1) that is provided at a first output interface 125A, 125B for powering a first load 190. The first load 190 may comprise, for instance, one or more light emitting elements such as LEDs or LED arrangements. The first output interface comprises a positive first output terminal 125A and a negative first output terminal 125B. The negative first output terminal 125B is connected to a ground or reference voltage.

The illustrated power factor circuitry 120 is also configured to perform AC-DC conversion, so that the PFC output signal V(C1) is a DC signal, or a near DC signal. To perform AC-DC conversion, the power factor correction circuitry 120 comprises a rectifying arrangement 121, here formed of a rectifier in the form of a diode bridge D12, D13, D14, D15 and a rectifying capacitor C9. The diode bridge D12, D13, D14, D15 rectifies the AC mains power $V_{AC}$ to form a single-polarity signal. The single-polarity signal is (at least partially) smoothed or filtered by the rectifying capacitor C9 to produce a rectified signal $V_R$. The voltage across the rectifying capacitor is therefore the rectified signal $V_R$, which is a rectified and smoothed/filtered version of the AC mains power $V_{AC}$.

The diode bridge D12, D13, D14, D15 may be replaced by another rectifier, such as a half wave rectifier. Similarly, the rectifying capacitor C9 may be replaced or supplemented with one or more other electronic filter components for smoothing the single-sided signal (e.g., one or more chokes, resistors and/or voltage regulators)

The power factor correction circuit 120 is also configured to perform power factor correction. This is achieved through appropriate control, using a PFC switch M2, of current flow of the rectified signal $V_{AC}$ from the rectifying capacitor C9, through a PFC winding/inductor L3 and to the first output interface 125A, 125B, producing the PFC output signal V(C1) at the first output interface 125A, 125B.

Generally, power factor correction circuitry is configured to correct or account for a distortion in power provided to a load or drawn by a load. In general, the output of the power factor correction circuitry follows the inherently 50/60 Hz sinuous waveform of the AC mains. The precise mechanism for controlling of the PFC switch M2 using the characteristics of a PFC winding L3 and/or capacitors C9, C1 to perform power factor correction may employ any well-known technique for performing power factor correction, which are known in the art. The control mechanism is therefore not described in detail for the sake of conciseness. As an example, the PFC circuitry may be a boost converter, as illustrated. Those skilled in the art would understand that other types of converters is also applicable as long as it can provide PFC function.

To at least partially reduce a high frequency switching signal in the PFC output signal V(C1), the power factor conversion circuitry may comprise an output capacitor C1 connected across the first output interface 125A, 125B, such that the PFC output signal V(C1) is a near-continuous signal that can be drawn by a load connected to the first output interface. However, the PFC output signal V(C1) will still have a low frequency ripple, representing the residual periodic variation resulting from the AC mains power $V_{AC}$ (which has not been suppressed). Actually, it is the purpose of the PFC that keeps the low frequency ripple otherwise the output would not follow the input.

The power factor conversion circuitry may further comprise a diode D16, connected between the PFC inductor/winding L3 and the first output interface 125A, 125B. The diode D16 also acts to prevent current from flowing from the output capacitor C1 back to the remainder of the power factor correction circuitry.

The power factor correction circuitry 120 can be disabled through appropriate control of the PFC switch M2. In particular, by keeping or maintaining the PFC switch M2 in a closed state (to allow the flow of current therethrough), no current is drawn by the load 190. In particular, keeping the PFC switch M2 in an open state stops or ends a boost operation of the PFC circuitry 120. The load of a boost converter will naturally require a higher voltage than the input voltage to the boost converter. Without the boost operation, the voltage of the signal provided to the first output interface 125A, 125B would not be boosted to this required higher voltage to drive the load, thereby preventing the PFC output signal V(C1) from powering the load 190 connected to the first interface.

Thus, the overall driver arrangement 100 may be operable in at least two modes. In a first mode or operation mode, the power factor correction circuitry 120 is controlled to provide the PFC output signal to the first output interface 125A, 125B, e.g., through appropriate control of the PFC switch. In a second mode or standby mode, the PFC circuity 120 is controlled to not provide the PFC output signal to the first output interface 125A, 125B, e.g., by maintaining the PFC switch M2 in a closed configuration or state.

The switched-mode power supply 130 is configured to compensate for the ripple in the PFC output signal V(C1) when the PFC output signal V(C1) is provided to the first output interface 125A, 125B (i.e., during the operation mode). More specifically, the switched-mode power supply is configured to generate an offset signal V(C2) which is superimposed with the PFC output signal V(C1) provided to the first load 190. This thereby compensates the ripple to thereby smooth the power provided to the first load 190.

The offset signal V(C1) is provided across a second output interface 135A, 135B. The second output interface comprises a positive second output terminal 135A and a negative second output terminal 135B. In the illustrated example, the second output interface is connected in series with the first output interface 125A, 125B, and the first load 190 is connected between across the first and second output interfaces. The negative second output terminal 135B is connected to the negative first output terminal 125A (and therefore, in the illustrated example, to the ground or reference voltage). In particular, the first load 190 is connected between the positive first output terminal 125A and the positive second output terminal 135A.

A second output capacitor C2 may be connected between the terminals of the second output interface.

The voltage between the first and second output interfaces is equal to the voltage across the second output interface subtracted from the voltage across the first output interface, i.e., V(C1)−V(C2). Thus, the power available to be drawn by the first load is the power across the first output interface minus the power across the second output interface. In principle, when the V(C1) is at the peak of the ripple, the SMPS 130 can work in high duty cycle to provide a large voltage V(C2); and when the V(C1) is at the valley of the ripple, the SMPS 130 can work in low or zero duty cycle to provide a small or zero voltage V(C2), such that V(C1)−V(C2) is more stable.

To generate the offset signal V(C2), the switched-mode power supply 130 may comprise a switching element M1 and a power commutation element L1, L2. The SMPS 130 in this embodiment operates as a flyback converter.

The illustrated power commutation element comprises a first winding or inductor L1 and a second winding or inductor L2 magnetically coupled thereto. The first winding L1 is connected in series with the switching element M1. The operation of the switching element M1 therefore controls whether current flows through the first winding L1.

The combination of the first winding L1 and the switching element M1 is connected in parallel with the rectifying capacitor C9. Thus, opening and closing the switching element M1 controls whether or not (respectively) current flows from the rectifying capacitor C9 through the first winding L1. The second winding L2 is magnetically coupled to the first winding L1, so that changing current flow through the first winding L1 induces a proportional changing current flow through the second winding L2.

The second winding L2 is coupled to the second output interface 125A, 125B, e.g. via at least one diode D1. More specifically, each end of the winding is connected to a respective second output terminal. A positive end of the second winding is connected to the positive second output terminal 125A via the diode D1. A negative end of the second winding is (directly) connected to the negative second output terminal 125B, i.e., to a ground or reference voltage. In this way, the current flow through the second winding L2 controls the voltage across the second output interface, and therefore across the second output capacitor C2. Accordingly, the operation of the switching element M1 defines the voltage across the second output interface via control of current flow through the first winding, which induces and defines current flow in the second winding and therefore the voltage across the second output interface.

The operation of the switching element M1 is controlled by a controller 131.

The controller 131 comprises a gate driver 139 that controls the operation of the switching element responsive to a feedback signal $S_{FB1}$, $S_{FB2}$. The feedback signal that is provided to the gate driver depends upon the mode in which the controller operates. In an operation mode, the gate driver 139 uses a first feedback signal $S_{FB1}$. In a standby mode, the gate driver uses a second feedback signal $S_{FB2}$. The first/second feedback signal used by the gate driver is controlled using switches S2, S3. In the operation mode, S2 is closed (and S3 open) so that the first feedback signal $S_{FB1}$ is used. In the standby mode, S3 is closed (and S2 open) so that the second feedback signal $S_{FB2}$ is used.

When used, the first feedback signal $S_{FB1}$ controls the operation of the switching element responsive to at least a first load current I(190), being a current through the load 190. The first load current I(190) is detected by a current detector R1, which may be connected in series with the first load 190, in the form of a first feedback voltage V(R1). This first feedback voltage V(R1) may undergo voltage division by a voltage divider R2, R3 to produce a modified first feedback voltage V(R3), but this is not essential.

The first feedback voltage V(R1), or the voltage divided version of the same, is processed by control logic 133 to produce the first feedback signal $S_{FB1}$.

For the standby mode, a second feedback voltage V(R5) may be used which is proportional to the voltage V(C2)/VCC across the second output interface 135A, 135B. For instance, the second feedback voltage V(R5) may be a voltage divided version of the first supply power V(C2)/VCC.

Figure 2:
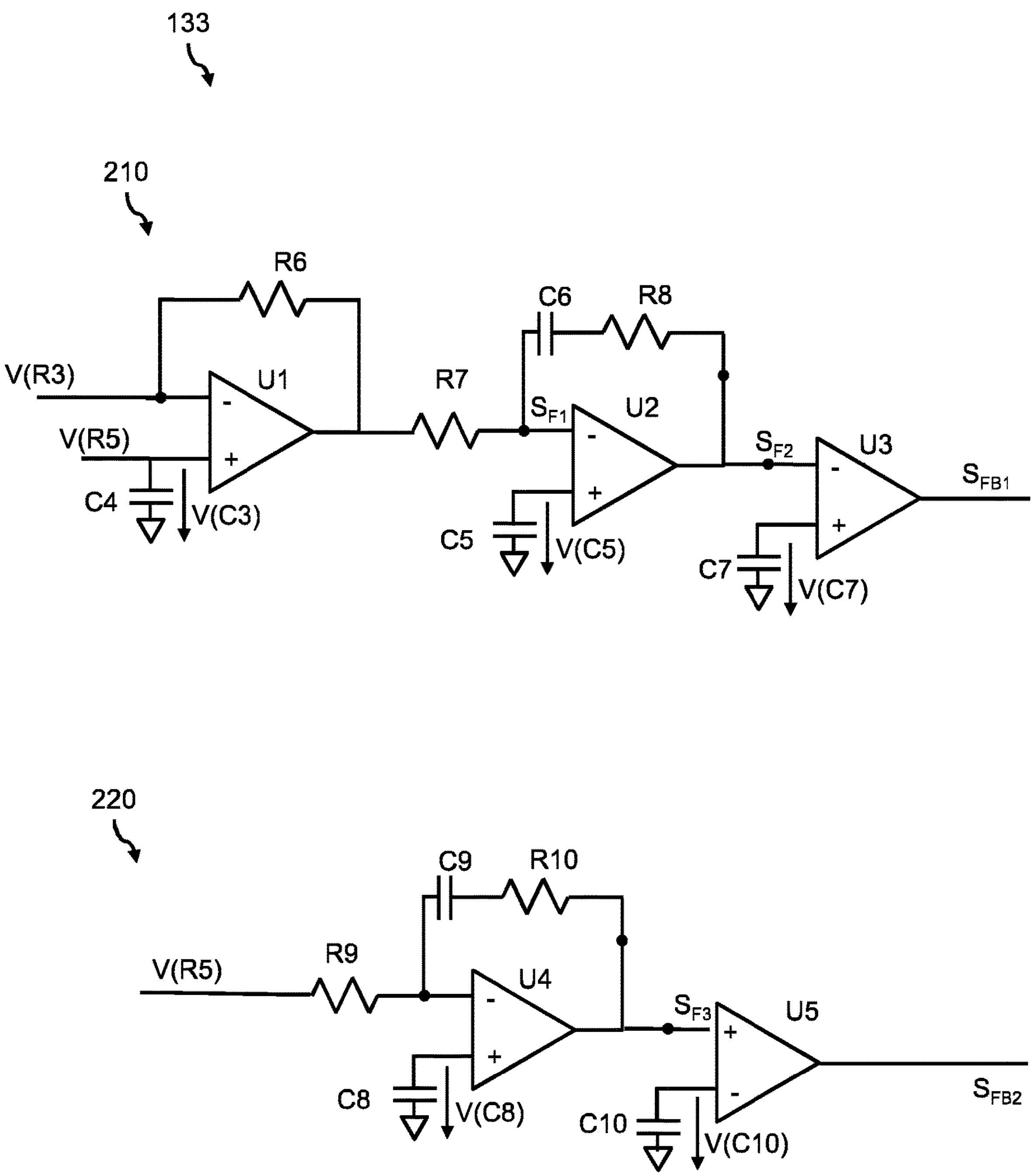
FIG. 2 illustrates control logic for use in embodiments.

FIG. 2 illustrates an example embodiment for the control logic 133. The control logic comprises first logic circuitry 210 for generating the first feedback signal $S_{FB1}$. The control logic also comprises second logic circuitry 220, the purpose and function of which will be described later in this disclosure.

The first logic circuitry 210 is configured to generate a pulse width modulated signal, which acts as the first feedback signal $S_{FB1}$.

The first logic circuitry 210 comprises a differential amplifier arrangement R6, U1 configured to amplify either the second feedback voltage V(R5) or the first feedback voltage V(R1) to produce an amplified signal $S_{F1}$. In normal operation, the output $S_{F1}$ of the U1 is an amplified signal of the current signal V(R3), representing the current value of the combined PFC output signal V(C1) and the offset signal.

The first logic circuitry also comprises an integrator arrangement U2, R7, R8, C6 configured to integrate a difference from a reference voltage V(C5) to the processed/amplified signal $S_{F1}$ so as to produce an integrated signal $S_{F2}$. The value of the integrated signal $S_{F2}$ will thereby be opposite with respect to the first load current I(190). The output of a comparator arrangement U3, which compares another reference voltage V(C7) which is a saw tooth signal across a reference capacitor C7 and the integrated signal $SF_2$, will be a pulse width modulated signal (e.g., a square signal). The higher the first load current, the lower the integrated signal $S_{F2}$, and the larger the duty cycle of the comparison result; and vice versa. This pulse width modulated signal acts as the first feedback signal $S_{FB1}$. The duty cycle of the first feedback signal $S_{FB1}$ will thereby increase when the first feedback voltage V(R5) representing the first load current is larger than some reference voltage, the increased duty cycle will make the SMPS 130 to output a larger voltage to counteract the PFC output so as to decrease the first load current; and decrease when the first load current is lower than this reference voltage.

Referring back to FIG. 1, the gate driver 139 will switch the switching element responsive to the pulse width modulation of the first feedback signal $S_{FB1}$. Thus, the value of the offset voltage V(C2) will track the ripple on V(C1). In this way, the voltage/current available to the load 190 will be near steady-state.

The controller thereby effectively acts as a negative closed-loop feedback system.

In this way, the controller 131 can control the operation of the switching element M1 to effectively eliminate or attenuate ripple in the power drawn by the first load.

The above-described operation of the switched-mode power supply 130 describes its operation during the operation mode of the driving arrangement, i.e., when the power is drawn by the load 190 via the first output interface 125A, 125B.

When the PFC output signal V(C1) is not provided to the first output interface 125A, 125B, no current flows through the first load 190, such that the first feedback voltage V(R1) is negligible. Accordingly, the operation of the switched-mode power supply does not respond to the first load current I(190) during the standby mode of the driver arrangement (i.e. no offset signal needs to be generated).

There is a desire to supply power to a second load (not shown). Embodiments propose a system for continually supplying power VCC to the second load ("second load power") during both the operation mode and the standby mode of the driving arrangement.

Suitable examples of second loads include one or more of the following: a microcontroller; a radio-frequency communication unit; and/or a sensor.

In particular, proposed approaches make use of an auxiliary power converter 140 for supplying second load power VCC during the operation mode, and make use of the switched-mode power supply 130 to provide second load power VCC during the standby mode.

During the operation mode, as the PFC circuitry switches, the auxiliary power converter 140 is energized and provides an operation mode supply power VCC for the second load. As the PFC circuitry stops switching in the standby mode, the auxiliary power converter 140 is not energized and is disabled during the standby mode, so that it is unable to supply power to the second load.

During the standby mode, the switched-mode power supply 130 is controlled to supply the second load power. The switched-mode power supply 130 may be disconnected or disabled from providing the second load power during the operation mode.

The second load power VCC is provided at a VCC interface 150A, 150B, which may be formed of a positive VCC terminal 150A and a negative VCC terminal 150B. A VCC capacitor C3 may be connected between the positive VCC terminal 150A and a negative VCC terminal 150B to smooth a signal provided to a second load connected thereto.

More specifically, the auxiliary power converter 140 comprises an auxiliary power winding or inductor L4, which is magnetically coupled to the PFC winding L3. Thus, when the power factor correction circuitry 12 is active and the PFC winding conducts a HF switching current (due to the power factor correction control), the auxiliary power winding is induced with a varying voltage and draws power from the PFC winding L3, namely from the power factor correction circuitry, and provides the second load power VCC to the VCC interface 150A, 150B (via a diode D2).

In this way, during the operation mode, the auxiliary power converter 140 provides an operation mode supply power for the second load.

In the standby mode, the power factor correction circuitry 120 is effectively disabled, meaning that no or negligible current is induced in the auxiliary power winding L4, i.e., the auxiliary power winding L4 is not energized. In this way, the auxiliary power supply 140 becomes disabled.

It will therefore be apparent that the auxiliary power converter 140 becomes synchronously operational and disabled with the power factor correction circuitry 120.

There is therefore a need to supply power, specifically the second load power, during the standby mode without the use of the auxiliary power converter 140, which is disabled during the standby mode. Proposed embodiments repurpose the switched-mode power supply 130 to supply the second load power VCC during the standby mode.

Thus, the switched-mode power supply 130 has a second function in that is also able to generate a first supply power VCC for a second load (not shown) different from the first load 190. This second function may be active during a standby mode of the driving arrangement, i.e., when the PFC output signal is not provided to the first output interface 125A, 125B.

In this embodiment, the VCC interface 150A and 150B are essentially the second output interface 135A and 135B. Alternatively, the SMPS 130 may comprises another winding with a proper turn ratio with respect to the inductor L1, and the another winding is as a third interface of the SMPS 130 connected to the VCC interface, such that the another winding is induced with a proper VCC voltage when the SMPS 130 switches. In that case, the winding L2 can be regarded as an open circuit thus does not influence the power conversion from the AC mains to the VCC.

During the standby mode, the operation of the switching element M1 is responsive to the second feedback signal $S_{F2}$, as previously explained.

The second feedback voltage V(R5) is used to control the operation of the switching element. The second feedback voltage is proportional to the voltage V(C2) equal to the VCC.

Referring to FIG. 2, the second control circuitry 220 is configured to generate the second feedback signal. The difference from a reference voltage V(C7) to the second feedback voltage V(R5) is integrated by a second integrator arrangement R9, C8, R10, U4 to produce an integrated output signal $S_{F3}$. The integrated output signal $S_{F3}$ is opposite with respect to the second feedback voltage V(R5). The integrated output signal is compared to another reference voltage V(C9) to produce a pulse width modulated signal that acts as the second feedback signal $S_{FB2}$. The second feedback signal $S_{FB2}$ is the integrated output signal $S_{F3}$ minus a saw tooth signal V(C10).

When the second feedback voltage V(R5), and therefore the VCC value, is larger than some reference value, the signal $S_{F3}$ is small and the duty cycle of the second feedback signal $S_{FB2}$ will decrease so as to decrease the VCC voltage. Similarly, the duty cycle of the second feedback signal will increase when the second feedback voltage V(R5), and therefore the VCC value, is smaller than some reference value. Thus, the VCC value is regulated to some setting value.

As previously explained, the feedback signal used to drive the gate driver is switched from the load current I(190) in the operation mode to the VCC voltage responsive to the output voltage V(C2) of the switched-mode power supply 130 in the standby mode. The switched-mode power supply can therefore be worked as a constant voltage source to supply or control the first supply power for the second load.

It is noted that, during the operation mode, the second feedback voltage V(R3) will be much lower than the first feedback voltage V(R1). This is because the magnitude of the offset signal V(C2) is much smaller than the first feedback voltage V(R1) (for appropriately chosen values of the sensing resistor R1 and the first R3 and second R4 resistive elements).

Thus, during the standby mode, the voltage across the second output interface is the first supply power VCC for a second load.

During the operation mode, the auxiliary power converter 140 provides the supply power VCC for the second load. The supply power provided by the auxiliary power converter 140 may be referred to as the second supply power.

The second output interface 135A, 135B may be selectively connected and disconnected from the VCC interface 150A, 150B via a switch S1. The switch S1 may disconnect the second output interface from the VCC interface during the operation mode, to prevent distortion of the second supply power. To provide the first supply power VCC to a second load connected to the VCC interface from the SMPS 130 during the standby mode, the switch S1 may connect the second output interface to the VCC interface during the standby mode.

Thus, the switch S1 is configured to: when the driver arrangement operates in the operation mode, isolate the second output interface from the second load; and when the driver arrangement operates in the second mode, connect the second output interface to the second load.

Figure 3:
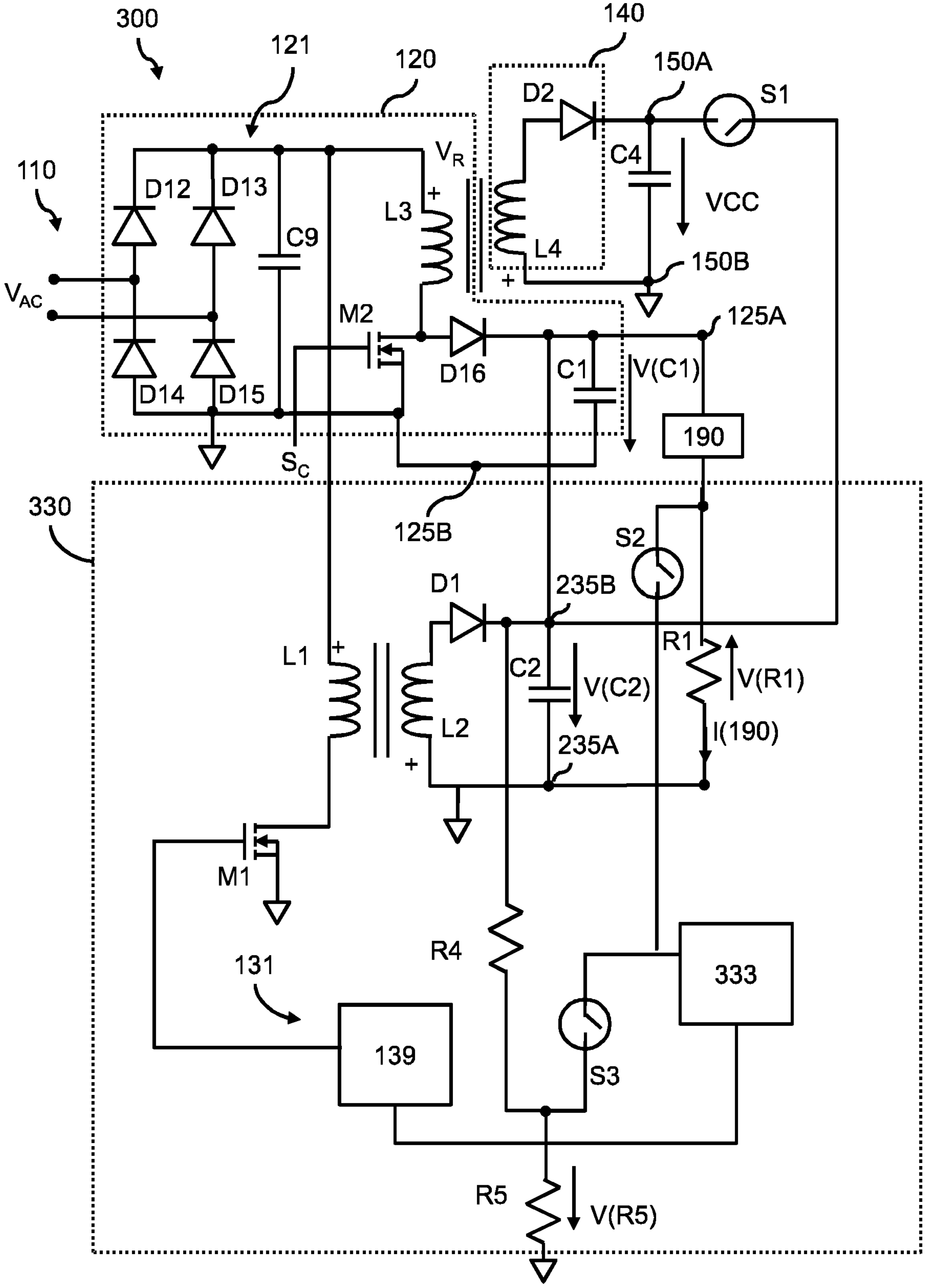
FIG. 3 illustrates a driver arrangement according to another embodiment.

FIG. 3 illustrates an alternative version of the driver arrangement 300. The driver arrangement 300 differs in the configuration of the switched-mode power supply 330. The other components are identical to those illustrated in FIG. 1, and the relevant descriptions are not repeated for conciseness.

The switched-mode power supply 330 differs from the previously described example in that the second output interface 235A, 235B is connected in parallel with the first output interface 125A, 125B.

By connecting the first and second output interfaces parallel to one another, the same logic circuitry (of the control logic 133) can be repurposed for controlling the switching element M1 in both the operation mode and the standby mode, i.e. only a single feedback signal is generated.

The control logic 333 may, for instance, comprise the second logic circuitry 220 described with reference to FIG. 2. The input voltage to the second logic circuitry in this embodiment is switchable between the first feedback voltage V(R1) and the second feedback voltage V(R5), rather than being permanently connected to the second feedback voltage V(R5), using switches S2 and S3. This switch is dependent upon the mode of the driver arrangement 300.

When the driver arrangement operates in the operation mode, the first feedback voltage V(R1) of the load current is used as the input voltage. When the driver arrangement operates in the standby mode, the second feedback voltage V(R3) of VCC is used as the input voltage. The second logic circuitry 220 is a negative feedback loop, and it will regulate the input, either the load current or the VCC voltage, to be constant in both modes.

During the operation mode, switch S2 on and switches S1 and S3 off. The first load current I(190) is sensed (via the first feedback voltage V(R1)) for ripple cancellation and current close loop control such that the load current is regulated constant. The auxiliary power converter provides an auxiliary power supply VCC. Please note that the SMPS 130 can operate only at a valley or near zero portion of the PFC signal/AC mains voltage such that the 50/60 Hz ripple is partially compensated, leaving a high frequency order of ripple which is less perceptible.

During standby mode, switch S2 is off, and switches S1 and S3 on. The voltage across the second output interface V(C2) is sensed (via the second feedback voltage V(R5)) for close loop control of the voltage across the second output interface and to provide the auxiliary power VCC to be constant.

An advantage of this embodiment is that a same set of feedback/comparing components can be shared among the control loop for cancelling the ripple and the control loop for providing the VCC, since their control logic are both negative feedback control Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa. Any reference signs in the claims should not be construed as limiting the scope.

The invention claimed is:

1. A driver arrangement for powering a first load and a second load, wherein the driver arrangement is configured to be switchable between at least an operation mode and a second mode, the driver arrangement comprising:

an input interface to receive an AC mains power;

a power factor correction, PFC, circuitry connected to the input interface and comprising a first output interface adapted to electrically connect to a first load, the power factor correction circuitry being configured to operate to generate, from the AC mains power, a PFC output signal at the first output interface thereby providing the first load with the PFC output signal in the operation mode, the PFC output signal having a ripple corresponding to the AC mains power, and the driver arrangement is adapted to disable the power factor correction circuitry in the second mode; and a switched-mode power supply configured to:

generate an offset signal at a second output interface of the switched-mode power supply and superimpose said second output interface with the first output interface across first load terminals for the first load such that the offset signal and the PFC output signal provided to the first load are superimposed, to compensate the ripple to thereby smooth the power provided to the first load, in the operation mode, and generate a first supply power across a second load terminals, different from the first load terminals, for a second load different from the first load meanwhile the driver arrangement being adapted to disable the switched-mode power supply from generating the offset signal, in the second mode.

2. The driver arrangement of claim 1, wherein the switched-mode power supply is connected to the input interface and configured to:

when the driver arrangement operates in the second mode, operate to generate the first supply power at the second output interface and/or at a third output interface of the switched-mode power supply.

3. The driver arrangement of claim 2, wherein:

the second mode is a standby mode which is adapted for disabling the first load but still powering the second load is; and when the driver arrangement operates in the standby mode, the driver arrangement is adapted to disable the power factor correction circuitry from generating the PFC output signal at the first output interface, and the driver arrangement is adapted to disable the switched-mode power supply from generating the offset signal at the second output interface such that no PFC output signal or offset signal superimposed to the first load.

4. The driver arrangement of claim 2, wherein, the driver arrangement further comprises a connection, which is able to be cut off, connected with the switched-mode power supply and to be connected with the second load, and when operating in the operation mode, the connection is adapted to be cut off so as to prevent or restrict the switched-mode power supply from generating or providing the first supply power to the second load.

5. The driver arrangement of claim 4, wherein the switched-mode power supply is configured to generate the first supply power for the second load at the second output interface, and the driver arrangement further comprises a switch connected with the second output interface and to be connected with the second load and configured to:

when the driver arrangement operates in the operation mode, be open so as to cut off the connection between the second output interface and the second load; and when the driver arrangement operates in the second mode, be close so as to connect the second output interface to the second load.

6. The driver arrangement of claim 2, further comprising an auxiliary power converter separate to the switched-mode power supply and to be connected to the second load, the auxiliary power converter being configured to:

when the driver arrangement operates in the operation mode, operate to generate and provide a second supply power for the second load; and when the driver arrangement operates in the second mode, the driver arrangement is adapted to disable the auxiliary power converter from generating and providing the second supply power to the second load.

7. The driver arrangement of claim 6, wherein the auxiliary power converter is magnetically coupled to the power factor correction circuitry such that, as the driver arrangement switches between the operation mode and the second mode, the power factor correction circuitry and the auxiliary power converter synchronously becomes operate for respectively supplying the first load and the second load in the operation mode and disabled respectively from supplying the first load and the second load in the second mode.

8. The driver arrangement of claim 1, wherein the second output interface is connected in series with the first output interface and the series connection of the first and second output interfaces is adapted to connect across the first load.

9. The driver arrangement of claim 1, wherein the second output interface is connected in parallel with the first output interface, and the first and second output interfaces are adapted to connect across the first load.

10. The driver arrangement of claim 1, wherein the switched-mode power supply comprises:

a switching element and a power commutation element, for generating the offset signal and/or the first supply power; and a controller configured to control an operation of the switching element in order to adjust the offset signal and/or the first supply power.

11. The driver arrangement of claim 10, wherein the switched-mode power supply comprises:

a current detector adapted to connect in series to the first load and detect a first load current, being a current through the first load; and the controller is configured to generate the offset signal by controlling the operation of the switching element to adjust the offset signal so as to align the first load current with a reference current.

12. The driver arrangement of claim 10, wherein the switched-mode power supply comprises:

a voltage detector adapted to detect a first supply voltage, being the voltage of the first supply power;

wherein the controller is configured to generate the first supply power by controlling the operation of the switching element to adjust the first supply voltage so as to align the detected first supply voltage with a reference voltage.

13. A lighting system comprising:

the driver arrangement of claim 1;

one or more light emitting diodes as the first load; and the second load.

14. The lighting system of claim 13, wherein the second load comprises one or more of the following: a microcontroller; a radio-frequency communication unit; and/or a sensor.

* * * * *